Sept. 29, 1953   J. A. BITZER ET AL   2,653,840
JOINTED HANDLE
Filed May 2, 1950
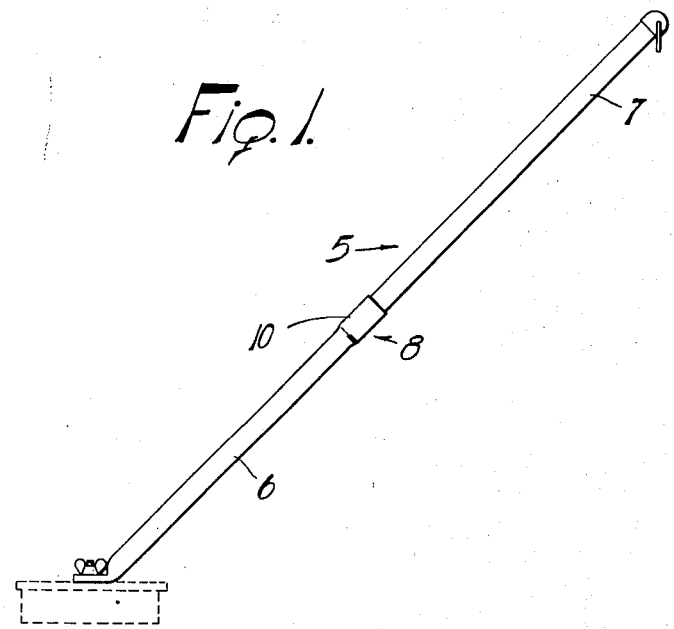
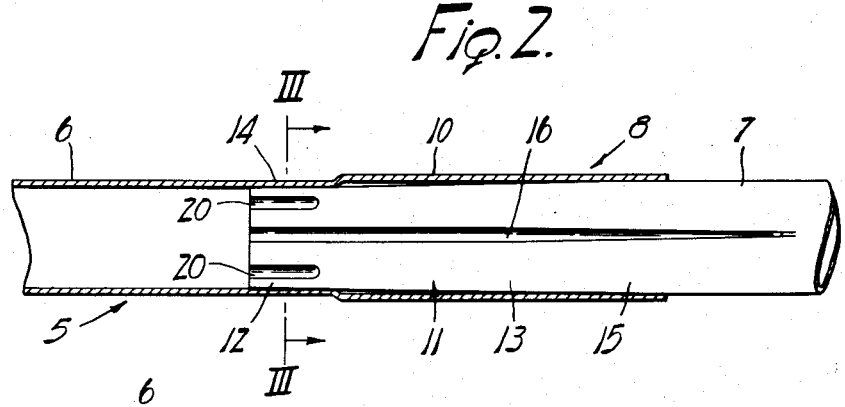
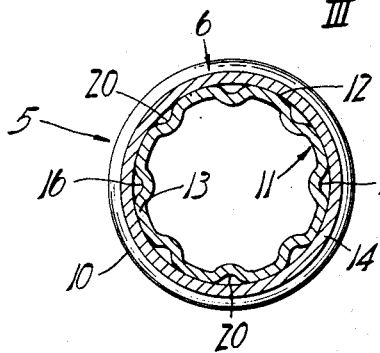
INVENTORS
Jack A. Bitzer and
Edwin N. Woistmann
BY
Bean, Brooks, Buckley & Bean.
ATTORNEYS Patented Sept. 29, 1953

2,653,840

UNITED STATES PATENT OFFICE 2,653,840

JOINTED HANDLE

Jack A. Bitzer, Lancaster, and Edwin N. Woistmann, Buffalo, N. Y., assignors to O-Cel-O, Inc., Buffalo, N. Y.

Application May 2, 1950, Serial No. 159,584

1 Claim. (Cl. 287—126)

Our invention relates in general to handles for use in connection with mops, sectional fishing rods, and the like, and in particular to a jointed or knock-down structure made up of a number of detachable parts.

It is well known to those skilled in the art that in handles of this type it is sometimes difficult to separate the handle units or parts at the joint. Furthermore, by repeated assembling and disassembling, such joints may become loose, thereby failing to firmly hold the parts together.

The principal object of our invention is to provide a handle made up of a number of parts joined together by coupling means which will firmly hold the parts in assembled position while in use.

A further object is to provide a coupling means which will compensate for wear and distortion of the parts thereof as a result of continued use, and which will provide rigid aligned joints at all times.

Furthermore, the coupling means of our invention is such that the handle parts may be easily and readily separated when desired.

The above objects and advantages have been accomplished by the device shown in the accompanying drawings, of which:

Fig. 1 is a side elevation of a handle to which our invention has been applied;

Fig. 2 is an enlarged sectional elevation of the joint between the handle parts; and, Fig. 3 is an enlarged sectional view taken on line III—III of Fig. 2.

Our invention is applicable to jointed handles consisting of parts which are fastened together in knock-down or collapsible manner, such as a mop handle, a fishing rod, the tube of a vacuum cleaner, or other devices, but for convenience we have shown our invention as applied to a two-piece jointed mop handle.

As shown in the drawings, the handle 5 is formed with an outer part 6 and an inner part 7, joined together by means of our coupling 8. The inner and outer parts 6 and 7 of the handle are preferably made from tubing of the same inside and outside diameters.

The coupling comprises a socket member 10 formed at one end of the outer part 6, and a stud member 11 formed at one end of the inner part 7. The socket member 10 is enlarged in diameter preferably by swaging or stretching so that it will have an inside diameter slightly less than the normal outside diameter of the inner part 7, whereby it will have slip-fitting engagement therewith. The stud member 11 is formed at its outer end with a tapered portion 13 terminating in the end 12 which has a diameter slightly less than the normal inside diameter of the cylindrical portion 14 of the outer part 6, whereby it may be slip-fitted therein. The end 12 of the stud member as shown in Figs. 2 and 3 of the drawing, is of generally cylindrical form, and it will be noted that the tapered portion 13 of the stud member extends inwardly from the inner end of the generally cylindrical end portion 12, said tapered portion tapering inwardly from its inner end to the inner end of said cylindrical portion. The tapered portion 13 is preferably larger than the socket member 10 whereby it will snugly fit therein when assembled.

It will be clear from Fig. 2 that the outer part 6 has a differential diameter owing to the formation of the enlarged socket member 10, and that the tapered portion 13 of the inner part 7 is so proportioned that when assembled within the outer part, its inner end 12 has circumferential contact with the portion 14 of the outer part. When so positioned the inner end 15 of said tapered portion has simultaneous circumferential contact with the exposed end of the socket member, whereby two widely spaced bearings are provided between the handle parts. Owing to the provision of the tapered portion on the upper part of the handle and the two spaced bearing points provided by the outer part thereof, substantially all wear and distortion produced at the bearing points of the coupling means will be compensated for by additional relative axial movement of the parts when assembling, whereby firm, but easily detachable connection of the handle parts will be assured at all times.

The tapered portion 13 may be formed at one end of the inner part 7 in any suitable manner, but for clearness of illustration, we have shown the wall of the tubing provided with a tapered flute 16 formed at two or more places around the circumference thereof which causes the wall to be contracted to provide the required taper of this portion. The reduced generally cylindrical end 12 of this portion is also formed by the provision of additional flutes 20 equidistantly spaced around the tubing wall.

It has been found by reason of the specific construction above described, that even though the handle parts are assembled and disassembled many times with consequent wear and with progressive deformation of the metal parts, each time the members are reassembled they may be forced axially into firm inter-fitting relation because the end 12 of the tapered portion 13 of the stud member always provides firm bearing contact with the inside wall of the outer part at the portion 14, and also because the outer end of the socket member always slides onto a fresh portion of the outer end 15 of the tapered portion. Thus, when the parts are assembled there are provided two widely spaced zones of bearing connection, thereby assuring perfect alignment of the parts at all times.

While we have shown the tapered portion 13 as being formed by the provision of flutes, it is obvious that this portion may be formed from the normal tube stock of the inner part 7 by any other suitable means, such as swaging or the like. These and other modifications of the details herein shown and described may be made without departing from the spirit of our invention or the scope of the appended claim, and we do not wish, therefore, to be limited to the exact embodiment herein shown and described.

What we claim is:

A jointed handle consisting solely of a hollow cylindrical body part terminating at one end in an enlarged cylindrical socket member with an annular shoulder portion intermediate the inner end of said socket member and the adjacent portion of said body part, and a second hollow body part terminating at one end in a stud member; said stud member having a generally cylindrical outer end portion provided with spaced axially extending fluted indentations in the wall thereof, and said stud member having a portion at least as long as said socket member extending inwardly from the inner end of said generally cylindrical outer end portion and tapering inwardly from its inner end to the inner end of said generally cylindrical outer end portion of the stud member, the generally cylindrical outer end portion of the stud member being of a diameter slightly less than the interior diameter of that portion of said first body part adjacent the inner end of said socket member, and the inner end portion of the tapering portion of the stud member being of a diameter slightly greater than the interior diameter of said socket member; the stud member being telescopically received in said socket member and the portion of the first body part adjacent the inner end of said socket member, with the outer generally cylindrical end portion of the stud member in snug fitting engagement with that portion of the first body part adjacent the socket member, and the outer end portion of the tapering portion of the stud in engagement with the annular shoulder portion of the first body part; and with the inner end portion of said tapering portion of the stud in engagement with the outer end portion of said socket member, whereby the telescoped parts are accurately alined and firmly connected but yet allowing ready forcible axial separation of said stud member from the socket member.

JACK A. BITZER.
EDWIN N. WOISTMANN.

References Cited in the file of this patent

UNITED STATES PATENTS

| Number | Name | Date |
|---|---|---|
| 430,458 | Abrahams | June 17, 1890 |
| 594,370 | Bailey | Nov. 30, 1897 |
| 672,548 | Durall | Apr. 23, 1901 |
| 1,164,801 | Frazier | Dec. 21, 1915 |
| 1,634,082 | Rigby | June 28, 1927 |
| 2,278,907 | Baker | Apr. 7, 1942 |
| 2,456,764 | Bach et al. | Dec. 21, 1948 |